April 21, 1936.  E. D. BRIGGS  2,038,340
PLOWSHARE
Filed Jan. 3, 1934  2 Sheets-Sheet 1
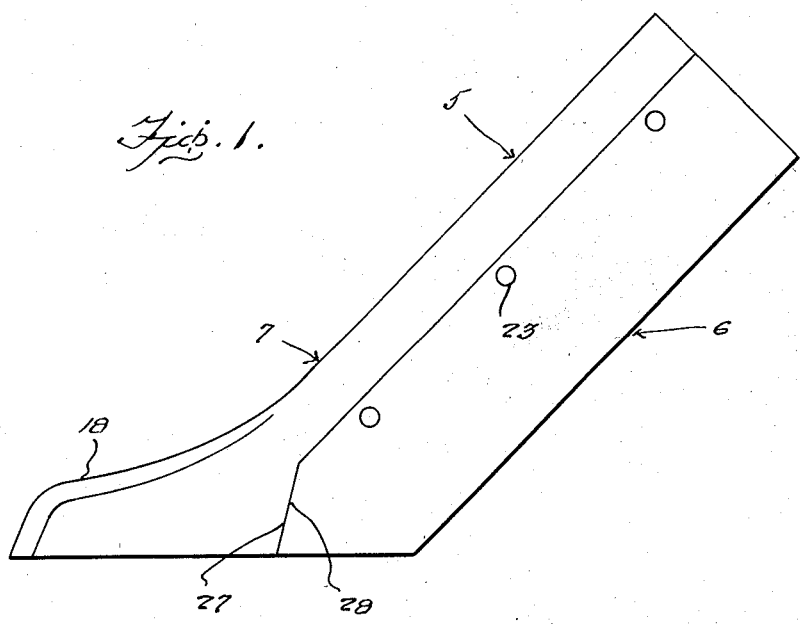
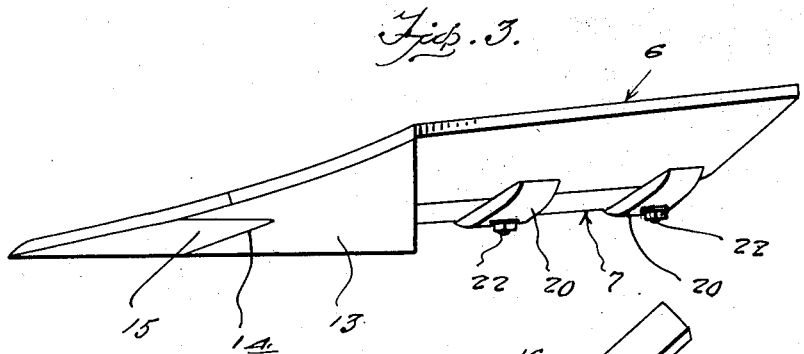
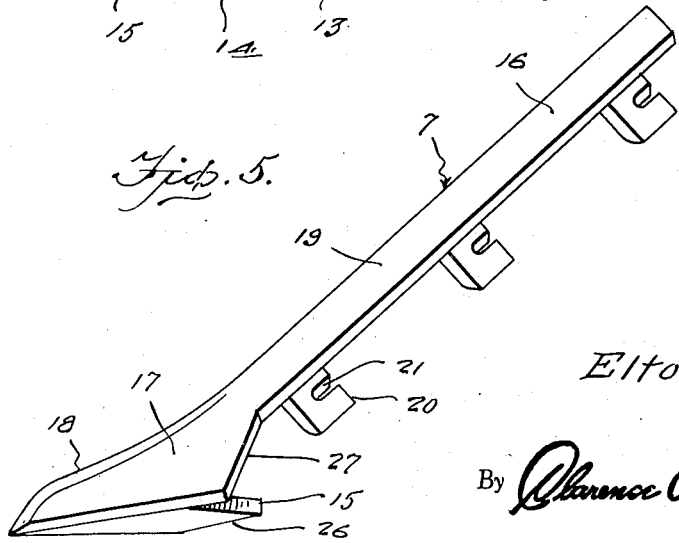
Inventor
*Elton D. Briggs*
By *Clarence A. O'Brien*
Attorney April 21, 1936.  E. D. BRIGGS  2,038,340
PLOWSHARE
Filed Jan. 3, 1934    2 Sheets-Sheet 2
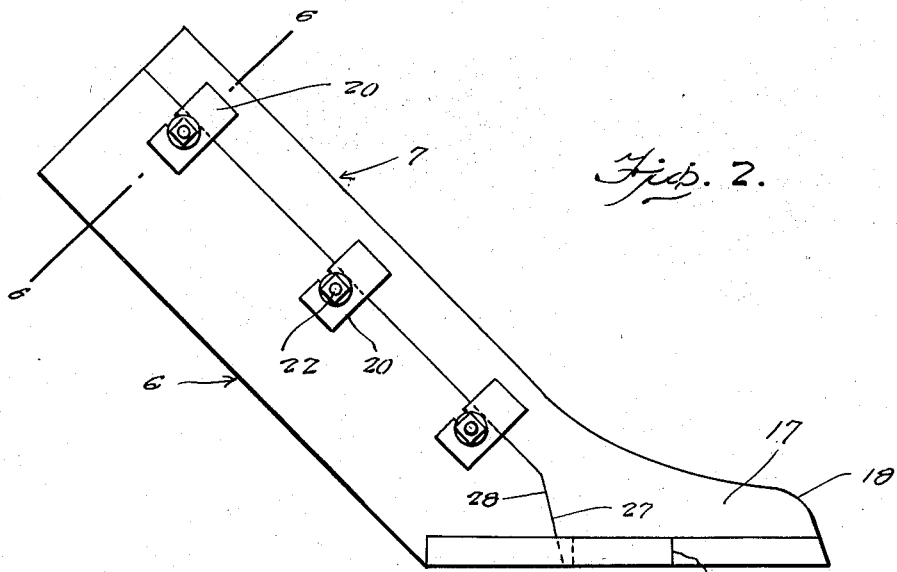
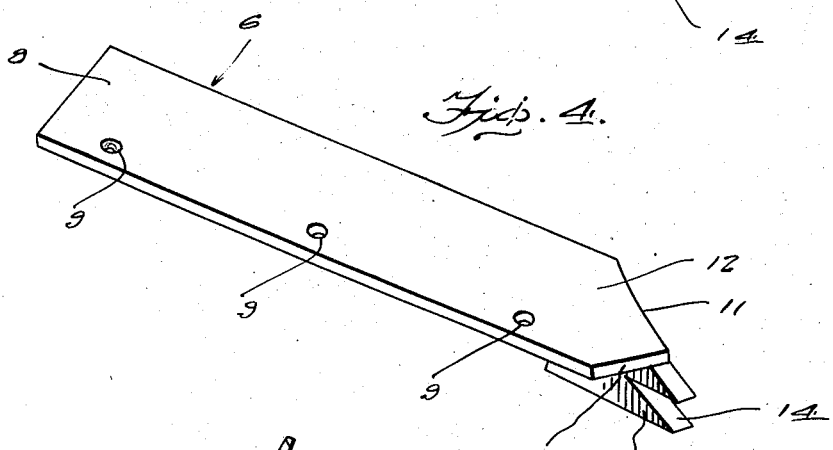
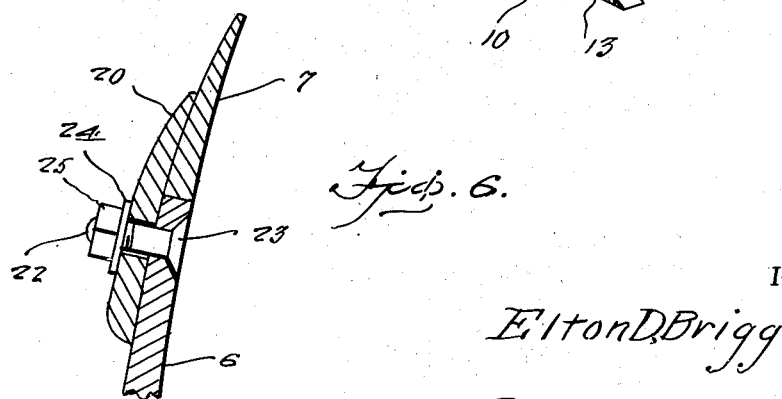
Inventor
EltonD.Briggs
By Clarence A.O'Brien
Attorney Patented Apr. 21, 1936

2,038,340

UNITED STATES PATENT OFFICE 2,038,340

PLOWSHARE

Elton D. Briggs, Ogden, Iowa

Application January 3, 1934, Serial No. 705,153

2 Claims. (Cl. 97—125)

My invention relates generally to a plow share, and particularly to a plow share having a removable cutting edge portion which is replaceable when worn, and an important object of my invention is to provide a plow share of this kind which is strong and rigid and equal in other respects to a one piece plow share.

It is also an important object of my invention to provide a simplified and mechanically adequate arrangement of the type described which enables the farmer to save the major portion of the expense of replacing an entire plow share, by providing for the replacement of the relatively less expensive detachable cutting edge portion when worn or broken.

Other objects and advantages of my invention will be apparent from a reading of the following description in connection with the drawings, wherein for purposes of illustration I have shown a preferred embodiment of my invention.

In the drawings:—

Figure 1 is a general side elevational view of the embodiment.

Figure 2 is a view of the opposite side of Figure 1.

Figure 3 is a perspective view.

Figure 4 is a perspective view of the body portion of the plow share to which the detachable cutting edge portion shown in Figure 5 is to be connected.

Figure 5 is a perspective view of the detachable cutting edge portion.

Figure 6 is a transverse sectional view taken through Figure 1 approximately on the line 6—6.

Referring in detail to the drawings the numeral 5 refers generally to the embodiment of the invention which includes the body portion 6 and the removable or detachable cutting edge portion 7. The members 6 and 7 are so connected detachably that they conform generally to the shape, size and arrangement of a conventional plow share of this general class.

The body portion 6 comprises a flat elongated relatively narrow plate 8 provided near one edge with longitudinally spaced bolt holes 9 and having one end formed to provide a short angular end portion 10 meeting a relatively longer angulated end portion 11. Extending laterally from the end 12 of the body portion 6 which is formed with the end portions 10 and 11 is the lateral formation 13 which is a portion of the landside and is generally triangular in form as particularly well indicated in Figure 3. The apex portion of this landside portion 13 is provided with a V-shaped notch 14 to receive a triangular portion 15 on the landside portion of the cutting edge portion 7.

The cutting edge portion 7 comprises a comparatively narrow elongated plate 16 which has on its lower end a generally triangular enlarged portion 17 which is provided on its upper edge with a sharpened portion 18 having a curved contour. The face side 19 of this member is smooth, while the underside of this member is provided with spaced lugs 20 each of which has a side opening 21 to releasably receive the attaching bolts 22 which have their head 23 seated in a countersunk portion of the bolt holes 9 as shown in Figure 6 and their shank portion threaded so as to pass through the opening 21 and then receive a washer 24 which engages the outerface of the lug 20 and is held in place by the nut 25, as clearly shown in Figure 6. The contour of the body portion and of the cutting edge portion clearly appears in Figure 6.

The wide lower portion of the cutting edge 17 has laterally extending near the lower edge thereof the diamond shaped portion 26 which has the triangular portion 15 which enters the V-shaped notch in the body portion already mentioned, whereby the portion of the landside on the body portion and the portion of the landside on the cutting edge portion dovetail and are rigidly associated against movement, when the bolts 9 are in place and tightened, whereby to produce a rigid non-separating structure which will not work loose and can only be removed by loosening the bolts 22. By arranging the lugs 20 and the projecting parts of the bolts 22 on the under face of the plow share, the smooth regularity of the face side of the plow share is maintained unimpaired.

The removable cutting edge portion may be made of suitable steel and have welded thereto the portion 17 and the parts 15, 26, or the whole may be made of the same material. The lugs 20 may be cast or welded on the underside of the cutting edge portion. The body of the plow share may be of softer material and the portion 13 thereof may be made of harder material welded thereto, or the entire body portion may be made of the same material. A perfect permanent alignment of the parts described results from the dovetailing of the landside portions described and also from the engagement of the edge portion 27 on the cutting edge portion with an angulated edge portion 28 on the body portion which it abuts in the manner shown in Figures 1 and 2.

Although I have shown and described herein a preferred embodiment of my invention, it is to be definitely understood that I do not desire to limit the application of the invention thereto, and any change or changes may be made in material and structure and arrangement of parts, within the spirit of the invention and the scope of the subjoined claims.

What is claimed is:—

1. A plow share comprising a share having a landside part extending on one side of the lower end thereof, said landside part extending forwardly from the share and being formed in its front end with a V-shaped notch; a blade having a second landside part extending on one side of the lower end thereof, said second landside part having a V-shaped point extending rearwardly beyond the lower end of the blade and arranged to dovetail with said V-shaped notch of the first landside part, a portion of the first landside part being arranged to engage the side of the said lower end of the blade and one side of said V-shaped point while the point and the notch are dovetailed and the lower edge of the blade is resting on the upper edge of the share, and means fastening the share and the blade in position, said means comprising lugs on said blade depending below the lower edge thereof to lie against the corresponding side of said share, said lugs being formed in their rear side only with slots, and bolts carried by the corresponding side of said share and engageable with the slots in the lugs only in a movement which assembles the share and the blade, said lugs being disengageable from the bolts by an opposite movement and without removing the bolts from the share.

2. A plow share comprising a share having a landside part extending on one side of the lower end thereof, said landside part extending forwardly from the share and being formed in its front end with a V-shaped notch; a blade having a second landside part extending on one side of the lower end thereof, said second landside part having a V-shaped point extending rearwardly beyond the lower end of the blade and arranged to dovetail with said V-shaped notch of the first landside part, a portion of the first landside part being arranged to engage the side of the said lower end of the blade and one side of said V-shaped point while the point and the notch are dovetailed and the lower edge of the blade is resting on the upper edge of the share, and means fastening the share and the blade in position, said means comprising lugs on said blade depending below the lower edge thereof to lie against the corresponding side of said share, said lugs being formed in their rear side only with slots, and bolts carried by the corresponding side of said share and engageable with the slots in the lugs only in a movement which assembles the share and the blade, said lugs being disengageable from the bolts by an opposite movement and without removing the bolts from the share, said slots in the lugs being so arranged that working pressure on the blade engages the slots more securely with the bolts.

ELTON D. BRIGGS.